US012621683B2

(12) United States Patent
Bui et al.

(10) Patent No.: US 12,621,683 B2
(45) Date of Patent: May 5, 2026

(54) METHOD OF AUTOMATICALLY SELECTING ROLE FOR WIRELESS ACCESS POINTS IN A MULTIPLE ACCESS POINT NETWORK

(71) Applicant: VIETTEL GROUP, Ha Noi City (VN)

(72) Inventors: Dinh Dung Bui, Duc Tho District (VN); Uy Hoang Tran, Vinh Long City (VN); Trung Hieu Pham, Ha Noi City (VN); Hung Duy Ho, Dong Ha City (VN)

(73) Assignee: VIETTEL GROUP, Ha Noi City (VN)

( * ) Notice: Subject to any disclaimer, the term of this patent is extended or adjusted under 35 U.S.C. 154(b) by 318 days.

(21) Appl. No.: 18/427,946

(22) Filed: Jan. 31, 2024

(65) Prior Publication Data

US 2024/0259838 A1      Aug. 1, 2024

(30) Foreign Application Priority Data

Jan. 31, 2023      (VN) ............................... 1-2023-00589

(51) Int. Cl.
*H04W 24/02* (2009.01)
*H04W 84/12* (2009.01)

(52) U.S. Cl.
CPC ............ *H04W 24/02* (2013.01); *H04W 84/12* (2013.01)

(58) Field of Classification Search
CPC .............................. H04W 24/02; H04W 84/12
See application file for complete search history.

(56) References Cited

U.S. PATENT DOCUMENTS

| | | | | | |
|---|---|---|---|---|---|
| 2013/0322418 | A1* | 12/2013 | Ho | ......................... | H04W 48/20 |
| | | | | | 370/338 |
| 2021/0211959 | A1* | 7/2021 | Nakagawa | ............ | H04W 36/10 |
| 2024/0205048 | A1* | 6/2024 | Nandy | .................... | H04L 45/66 |

* cited by examiner

*Primary Examiner* — Zhiren Qin
(74) *Attorney, Agent, or Firm* — patenttm.us

(57) ABSTRACT

The proposed invention introduces a method for automatically selecting roles for Wi-Fi Access Points in a multi-AP network. It is designed for Wi-Fi Access Points that support LAN connections and adhere to the Wi-Fi EasyMesh standard published by the Wi-Fi Alliance. The method relies on the distinctive characteristics of each role to accurately determine the appropriate role for each Access Point. This innovation streamlines deployment, saving time, enhancing efficiency, and eliminating human errors.

1 Claim, 3 Drawing Sheets

METHOD OF AUTOMATICALLY SELECTING ROLE FOR WIRELESS ACCESS POINTS IN A MULTIPLE ACCESS POINT NETWORK

TECHNICAL FIELD OF THE INVENTION

Embodiments of the present disclosure provide a method of automatically selecting a role for Wi-Fi Access Points in a Multiple Access Point (Multi-AP) network. This invention applies to Wi-Fi Access Points supporting LAN connections as well as those following the Wi-Fi EasyMesh standard published by the Wi-Fi Alliance.

BACKGROUND OF THE INVENTION

A Multi-AP network is a system of access-point devices (AP) that support control protocols to enable onboarding, provisioning, control, and management of devices in a Wi-Fi network. The purpose of a Multi-AP network is to enhance coverage, ensure a quality connection, and simplify deployment.

A Multi-AP network (MAP network) may comprise numerous devices but consists of two types of logical entities: one Multi-AP Controller (Controller) and one or more Multi-AP Agents (Agent). The Controller implements the logic for controlling the fronthaul APs and backhaul links in the Multi-AP network. Additionally, the Controller provides onboarding functionality to onboard and provision Multi-AP devices onto the network. An Agent executes commands received from the Controller, reporting measurements and capabilities data for fronthaul APs, clients, and backhaul links to a Controller or other Agents.

The deployment process for a Multi-AP network following the Wi-Fi EasyMesh standard often includes the following steps:

Step 1: Select a role for Multi-AP devices.

Step 2: Perform onboarding between the new one and an existing device in the mesh network.

Step 3: After completing the process of joining all devices to the Multi-AP network, administrators can set up configurations for the network, such as WAN/Wireless configuration.

Step 4: Move the devices to the designated location.

A problem arises when setting up a device, as it requires accessing its administration web or using a specific mobile application to select a role. This method is inefficient, and the issue becomes more serious when dealing with a large number of devices. Additionally, this manual approach is prone to errors resulting from human actions.

DETAILED DESCRIPTION OF THE INVENTION

The invention proposes a method for automatically setting up roles for devices in a MAP network. An administrator needs to connect Ethernet cables for devices intending to join a MAP network, and then the devices will automatically select the correct role. Finally, the administrator only needs to configure network information and move devices to appropriate locations to complete the setup process.

The deployment of this invention is limited to end-users who prefer to use the Internet. In other cases, this solution may not be suitable, so administrators could resort to the old manual configuration method via a WEB UI or mobile application. However, AP products are often designed for Internet end-users in practical applications.

To achieve the goal of automatic role selection, each role must possess unique features for differentiation. The key characteristics of each role are described as follows:

Controller:

There is a single controller in a given MAP network.

The controller consistently functions as a routing role, essentially operating as a router capable of connecting to the Internet.

Agent:

There are one or more agents in a MAP network.

Agents cannot connect to the Internet without joining a MAP network.

If the device receives an "ieee1905 AP-autoconfiguration response message," it assumes the role of an agent.

The "ieee1905 AP-autoconfiguration search/response message" is defined in the IEEE 1905 standard and is employed to search for a registrar. In the Wi-Fi EasyMesh standard, these messages serve the purpose of Agents finding a Controller.

To assign a role to a device, it can rely on the aforementioned indicators.

The application of the invention is limited to a MAP network with an onboarding phase using Ethernet cables, providing Internet access for end-users. The deployment model in the practical environment is illustrated in FIG. 1, FIG. 2, FIG. 3, and FIG. 4. The devices in the models support connection interfaces, including WAN (a wide area network) port, LAN (a local area network) port, and wireless, following ieee802.11 standards.

In this embodiment, we consider devices connecting to the WAN port of a device as uplink devices. Conversely, devices connecting to the LAN side of a device are considered downlink devices, and devices connecting to the LAN of the same device are peer devices. Taking FIG. 2 as an example, AP1 is the uplink device of AP2 and AP3, and AP2 is the downlink device of AP1, and vice versa. AP1 and AP2 are at the same level in FIG. 3, similar to AP2 and AP3 in FIG. 2.

Figure 1:
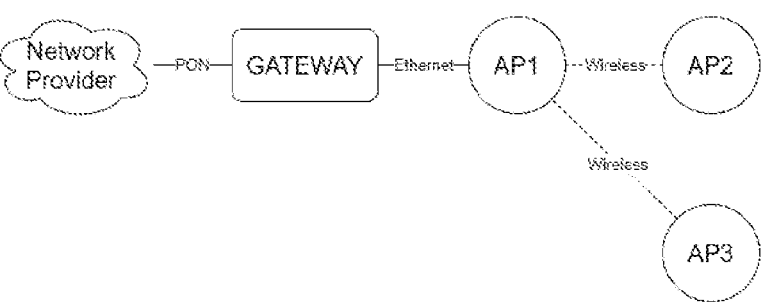
FIG. 1 depicts an example of a Multi-AP network commonly deployed in a real environment.
Figure 2:
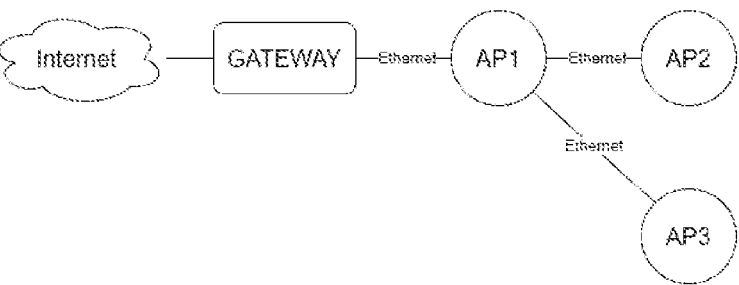
FIG. 2 depicts a Multi-AP network with only one MAP device connected to a gateway.
Figure 3:
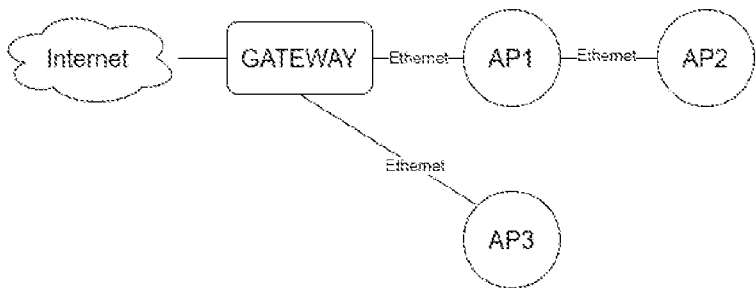
FIG. 3 depicts a Multi-AP network with more than one MAP device connected to a gateway.
Figure 4:
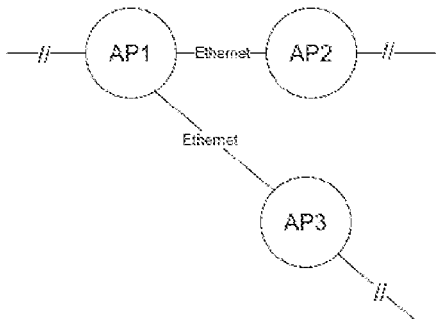
FIG. 4 depicts a Multi-AP network during the onboarding of APs without any uplink connection.

FIG. 2 shows a topology with only one AP playing the role of a router, and two other APs connected directly to the Gateway in FIG. 3. The expected deployment in FIG. 2 is that AP1 should be a controller, and the others should be agents. In FIG. 3, AP1 and AP3 are expected to be controllers. The distinction between the two role groups can be made by checking the Internet connection.

However, a challenge arises as all devices can connect to the Internet. Using FIG. 2 as an example again, where AP1 functions as a router and DHCP server, and the other APs act as DHCP clients, all devices can be allocated an IP by AP1 and gain Internet access. To address this, a solution is needed to restrict Internet access for specific APs, specifically those designated as agents, which still need to join the MAP network.

Typically, Internet access can be verified using the ICMP protocol (using applications like ping in Linux OS to send/ receive IGMP messages). A device sends ICMP request messages to a public server and awaits for responses; receiving ICMP response messages indicates Internet access. If the goal is to prevent downlink devices from checking their Internet status, the ICMP messages of these downlink devices must be blocked on their uplink device.

However, if, at a given time, no devices in the MAP network can access the Internet (for example, when the WAN interface is not plugged in), an alternative method is necessary. Using an election is one approach to address the issue. Devices in the MAP network collect MAC addresses from others and choose the device with the most significant MAC to assign as a controller. MAC information can be gathered using the 'ieee1905 AP-autoconfiguration request message,' advertised by APs supporting the EasyMesh standard in a MAP network. FIG. 3 illustrates for this case.

After identifying a controller, the next step is to establish the agent role for other devices. The key indicator for agent detection is that there is only one controller in a MAP network, and the rest are agents. However, signals or events are required to designate a device as an agent. The event to support this task is when a device receives the 'ieee1905 AP-autoconfiguration response message', confirming its status as an agent. The controller sends this message in response to the 'ieee1905 AP-autoconfiguration request message.'

The following description lists several conditions and requirements to set up a role automatically for devices. The setting order is a controller, then agents.

Controller:
   Must be capable of accessing the Internet; this can be verified using the ICMP protocol.
   Should connect to the Internet with the least number of hops; achieve this by blocking ICMP messages from the LAN.
   Only one device in a MAP network can serve as a controller. If more than one device meets the requirements above, the device with the most significant MAC address will become the controller.

Agent:
   There is more than one agent in a MAP network; the other device becomes a candidate for the agent role when finding a controller.
   An agent is a device that has received an "ieee1905 AP-autoconfiguration response message" after sending an "ieee1905 AP-autoconfiguration request message." Devices in a MAP network send "ieee1905 AP-autoconfiguration request message" periodically, and they only stop when assigned a role.
   An agent may or may not have access to the Internet. If Internet access is available, the MAC address should be considered. Conversely, if the Internet is not accessible, the device must wait for the "ieee1905 AP-autoconfiguration response message."

Given the conditions and requirements outlined above, the proposed method in the invention is structured into two phases with the steps as follows:
   The First Phase: Initial Phase (refer to FIG. 4):
   Step 1: Check the device role. Verify if the device has been assigned a role. If the role is assigned, the process is complete; otherwise, proceed to the next step.

Step 2: Initialize a cycle (referred to as T0) for sending the "ieee1905 AP-autoconfiguration request message." The cycle period (P0) must be pre-set (e.g., 5 seconds). This means the device will broadcast the "ieee1905 AP-autoconfiguration request message" every P0 seconds. This message enables the device to identify the presence of a controller in the MAP network. If the device receives a response message, a controller is configured in the network. If not, the process of configuring a controller continues. Additionally, this message helps other devices in the network update the MAC information of the sender.
   Step 3: Check the Internet connection. If the device has no Internet access, wait for a pre-set time (P1 seconds, e.g., 5 seconds) and recheck; otherwise, proceed to Step 4. This step assists in identifying a group where one of them could potentially serve as a controller.
   Step 4: Initialize a timer (referred to as T1). Check the status of T1; if it has not started, initiate it with a period of P2 seconds (e.g., 5 seconds). If it has already started, wait for P1 seconds and return to Step 4. This step is designed to set a default role for the devices. When the T1 counter times out (e.g., after 30 seconds), the device is designated as an agent.

Figure 5:
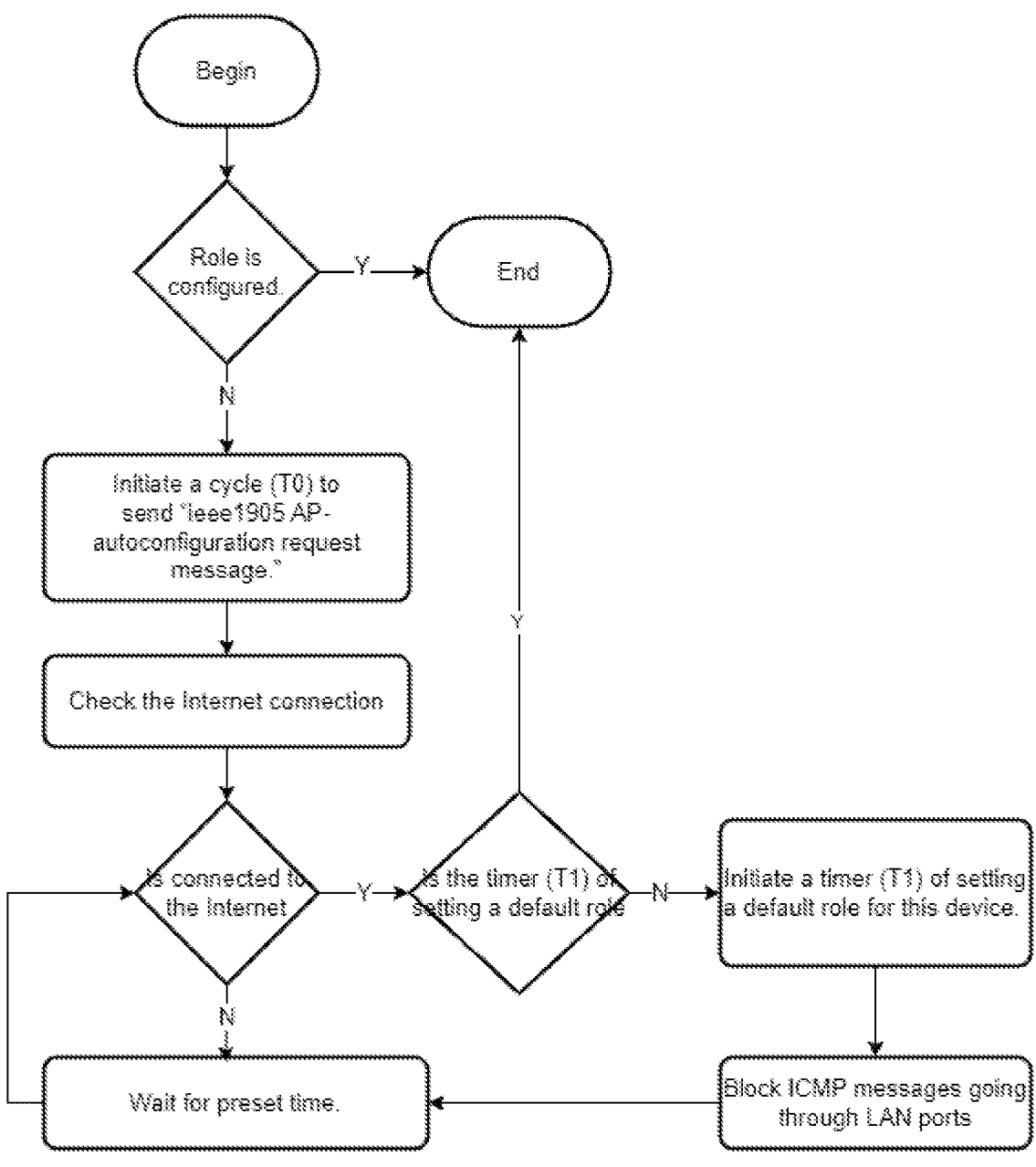
FIG. 5 is a flowchart illustrating the initial phase of the process of automatic role selection in a Multi-AP network.
Figure 6:
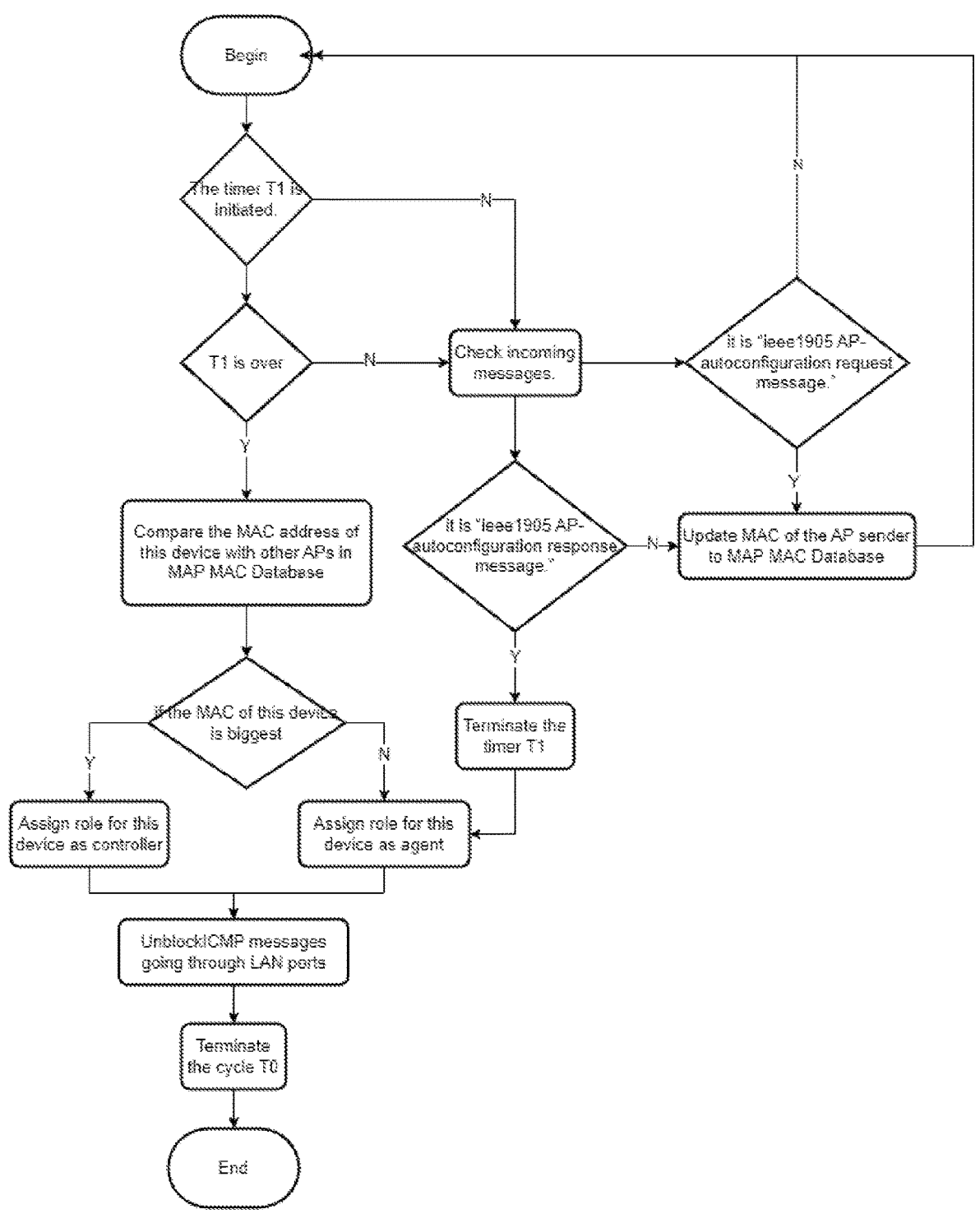
FIG. 6 is a flowchart illustrating the event handling for automatic role selection in a Multi-AP network.

The Second Phase: Event Processing Phase (refer to FIG. 5):
   Step 1: Handle when time is up for T1. Check if T1 has concluded; if T1 is ongoing or not started yet, proceed to Step 2; otherwise, move to Step 3.
   Step 2: Check for "ieee1905" messages. If an incoming message is "ieee1905 AP-autoconfiguration response message," proceed to Step 2a. If an incoming message is "ieee1905 AP-autoconfiguration request message," proceed to Step 2b. If the incoming message is neither of these two, return to Step 1.
   Step 2a: Stop T1 and T0, then assign the device to an agent role. Simultaneously, unblock ICMP messages for the LAN side.
   Step 2b: Update the MAC address included in the "ieee1905 AP-autoconfiguration request message" to the MAC database of devices in the MAP network (if the MAC does not exist in the database), then return to Step 1.
   Step 3: Assign a role by MAC address. The device compares its address with the MAC addresses of other devices stored in a MAC database established at Step 2b. The device configures itself as a controller if its MAC has the highest value; otherwise, its role is set to agent. After completing role selection, the device permits ICMP messages to pass through from the LAN side.

Implementation Example

The method has been implemented on home Wi-Fi access points manufactured by VHT. This solution significantly streamlines the deployment process, allowing administrators to save time and reduce the risk of human errors. Examples of deployment scenarios are illustrated in FIG. 1, FIG. 2, FIG. 3, and FIG. 4. The deployment process is notably more convenient when compared to the traditional method, which requires administrators to access the WEB UI or use a mobile app to configure roles.

With devices utilizing this innovative method, the manufacturer sets a default role called 'auto-role.' During deployment, the real role is automatically configured, further simplifying the overall process.

Here is an example of steps when deploying VHT APs.

For Users Preferring LAN for Backhaul Links:

1. Set up devices at the desired positions.
2. Connect them with Ethernet cables and power up.
3. Wait for the auto role selection process to complete; VHT APs will use LED indicators to signal the process's completion.
4. Finally, access the management WEB or mobile application to configure other information.

For Users Preferring Wireless for Backhaul Links:

1. Power up and connect LAN cables for all APs.
2. Wait for the auto role selection process to complete; VHT APs will use LED indicators to signal the process's completion.
3. Access the management WEB or mobile application to configure other information.
4. Finally, unplug LAN cables, move devices to the desired positions, and power them on again.

Results

A comparison between the old method and the new method of this invention shows that the new method brings several benefits, as shown in the following table:

| Aspect | Old method | Proposed method |
|---|---|---|
| Time to Deploy | Time-consuming | Time-saving |
| Complexity of Deployment | Complex | Simple |
| Risk of Errors | Prone to human errors | Reduce errors caused by human |
| Ability to automate | Manual | Automatic |

What is claimed is:

1. A method of automatically selecting role for wireless access-points in a Multi-Access Point (MAP) network, comprising:

a first phase: initial phase step 1: verify if a device has an assigned role; if the role is assigned, the process is complete; otherwise, proceed to the next step;

step 2: initialize a cycle (referred to as T0) with a pre-set period (P0) for sending an "ieee1905 AP-autoconfiguration request message";

step 3: check an Internet connection; if the device has no Internet access, wait for a pre-set time (P1 seconds) and recheck; otherwise, proceed to step 4;

step 4: initialize a timer (referred to as T1) with a pre-set duration of P2 seconds if the timer has not started; if the timer has already started, wait for P1 seconds and return to step 3;

a second phase: event processing phase:

step 1: handle events of timer T1; if T1 is ongoing or not started yet, proceed to step 2; otherwise, move to step 3;

step 2: check a type of "ieee1905" messages; if an incoming message is "ieee1905 AP-autoconfiguration response message," proceed to step 2a; else if an incoming message is "ieee1905 AP-autoconfiguration request message," proceed to step 2b; else if the incoming message is neither of these two, return to step 1;

step 2a: stop T1 and T0, then assign the device to an agent role and unblock Internet Control Message Protocol (ICMP) messages for its Local Area Network (LAN) side;

step 2b: update a Media Access Control (MAC) address included in the "ieee1905 AP-autoconfiguration request message" to a MAC database of devices in the MAP network; if the MAC address does not exist in the MAC database, then return to step 1;

step 3: assign a role based on MAC address; the device compares its address with the MAC addresses of other devices stored in the MAC database established in step 2b; the device configures itself as a controller if its MAC has the highest value; otherwise, its role is set to agent; upon completing role selection, the device allows ICMP messages to pass through from the LAN side.

*   *   *   *   *